United States Patent
Hwang

(10) Patent No.: US 11,299,107 B2
(45) Date of Patent: *Apr. 12, 2022

(54) CAMERA SIGNAL MONITORING APPARATUS AND METHOD

(71) Applicant: HYUNDAI MOBIS CO., LTD., Seoul (KR)

(72) Inventor: Tae Hun Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 20 days.

This patent is subject to a terminal disclaimer.

(21) Appl. No.: 16/847,014

(22) Filed: Apr. 13, 2020

(65) Prior Publication Data

US 2020/0331408 A1 Oct. 22, 2020

(30) Foreign Application Priority Data

Apr. 18, 2019 (KR) .................. 10-2019-0045341

(51) Int. Cl.
  *B60R 11/04* (2006.01)
  *H04N 5/232* (2006.01)
  *H04N 5/222* (2006.01)

(52) U.S. Cl.
  CPC .......... *B60R 11/04* (2013.01); *H04N 5/2228* (2013.01); *H04N 5/23206* (2013.01)

(58) Field of Classification Search
  None
  See application file for complete search history.

(56) References Cited

U.S. PATENT DOCUMENTS

| | | | | |
|---|---|---|---|---|
| 2011/0246071 | A1* | 10/2011 | Tsunekawa | G08G 1/166 701/301 |
| 2016/0327948 | A1* | 11/2016 | Taguchi | G05D 1/0251 |
| 2017/0332010 | A1* | 11/2017 | Asakura | G05D 1/0223 |

FOREIGN PATENT DOCUMENTS

| | | |
|---|---|---|
| CN | 106114513 A | 11/2016 |
| JP | 2007-192583 A | 8/2007 |

(Continued)

OTHER PUBLICATIONS

Office Action issued in corresponding Korean Patent Application No. 10-2020-0069945 dated May 31, 2021, with English translation.

(Continued)

*Primary Examiner* — Kaitlin A Retallick
(74) *Attorney, Agent, or Firm* — Morgan, Lewis & Bockius LLP

(57) ABSTRACT

The present invention provides a camera signal monitoring apparatus and method, the camera signal monitoring apparatus including a vehicle information input unit receiving a vehicle speed and a yaw rate signal of a vehicle; a navigation information input unit receiving a road curvature signal provided in a high precision map; a camera information input unit receiving a camera signal including a vehicle speed and a yaw rate signal from a vehicle front camera; and a monitoring unit calculating a reference curvature value based on at least one of the vehicle speed and the yaw rate signal of the vehicle, which are input from the vehicle information input unit, or the road curvature signal from the navigation information input unit, and determining a reliability by comparing the calculated reference curvature value with a curvature value calculated using the camera signal input from the camera information input unit.

17 Claims, 2 Drawing Sheets

(56) References Cited

FOREIGN PATENT DOCUMENTS

| | | |
|---|---|---|
| JP | 2011-073529 A | 4/2011 |
| KR | 10-2014-0091309 A | 7/2014 |
| KR | 10-2018-0006759 A | 1/2018 |
| KR | 10-2018-0116749 A | 10/2018 |

OTHER PUBLICATIONS

Office Action issued in corresponding Chinese Patent Application No. 202010307893.X dated Sep. 29, 2021.

* cited by examiner

CAMERA SIGNAL MONITORING APPARATUS AND METHOD

CROSS REFERENCE TO RELATED APPLICATION

The present application claims priority to Korean Patent Application No. 10-2019-0045341, filed Apr. 18, 2019, the entire contents of which is incorporated herein for all purposes by this reference.

BACKGROUND OF THE INVENTION

Field of the Invention

The present invention relates to a camera signal monitoring apparatus and method and, more particularly, to a camera signal monitoring apparatus and method that determines whether a signal output from a vehicle front camera is abnormal.

Description of the Related Art

Recently, for the convenience of a driver who uses a vehicle, various sensors and electronic devices are provided in the vehicle. In particular, research on an advanced driver assistance system (ADAS) has been actively conducted for driver convenience. Furthermore, an autonomous vehicle has been actively developed.

In addition, many automakers are presenting semi-autonomous driving functions on the basis of their own algorithms and systems. Typical examples of the systems include a smart cruise control that maintains a vehicle speed relative to vehicles in front and performs functions in conjunction with navigation, a lane keeping assist (LKA) that actively keeps a vehicle in lane, a forward collision-avoidance assist, an emergency braking system, and the like.

Such systems perform vehicle control using the information input through a vehicle front camera, and the vehicle front camera receives a yaw rate signal and vehicle speed information of the vehicle and provides lane information, lane offset, curvature information, and the like for the purpose of vehicle control.

The reliability of information output from the front camera is important. In the related art, the vehicle controller cannot interpret signal processing inside the camera, so that it is not clear whether the front camera signal is normal or abnormal, or at what period and when to check the signal. When the yaw rate signal used inside the front camera is incorrectly input or erroneously corrected, errors are caused in the output value, which results in a malfunction when controlling the vehicle using the front camera.

SUMMARY OF THE INVENTION

The present invention has been made keeping in mind the above problems occurring in the related art, and the present invention has an objective to provide a camera signal monitoring apparatus and method that determines whether signal output from a vehicle front camera is abnormal according to the reliability of a calculation algorithm inside the camera.

A camera signal monitoring apparatus according to an aspect of the present invention includes a vehicle information input unit receiving a vehicle speed and a yaw rate signal of a vehicle; a navigation information input unit receiving a road curvature signal provided in a high precision map; a camera information input unit receiving a camera signal including a vehicle speed and a yaw rate signal from a vehicle front camera; and a monitoring unit calculating a reference curvature value based on at least one of the vehicle speed and the yaw rate signal of the vehicle, which are input from the vehicle information input unit, or the road curvature signal from the navigation information input unit, and determining a reliability by comparing the calculated reference curvature value with a curvature value calculated using the camera signal input from the camera information input unit.

According to the present invention, the monitoring unit may include a signal processing unit that filters signals input from at least one of the vehicle information input unit, the navigation information input unit, and the camera information input unit.

According to the present invention, the monitoring unit may include an vehicle trajectory calculator that calculates the vehicle driving trajectory on the basis of an offset-corrected yaw rate signal and the vehicle speed from the vehicle information input unit, in which the vehicle trajectory calculator calculates a first curvature value by dividing a yaw rate value of the offset-corrected yaw rate signal by a vehicle speed value of the vehicle speed signal.

According to the present invention, the vehicle trajectory calculator may calculate the vehicle driving trajectory when the vehicle speed value and the yaw rate value are less than or equal to a threshold value.

According to the present invention, the monitoring unit may include a reference curvature calculator that calculates the reference curvature value by combining the first curvature value calculated by the vehicle trajectory calculator and a second curvature value of a road curvature signal received from the navigation information input unit.

According to the present invention, the reference curvature calculator may calculate the reference curvature value by combining the first curvature value and the second curvature value when the second curvature value is input from the navigation information input unit, and determines the first curvature value as reference curvature value when the second curvature value is not input from the navigation information input unit.

According to the present invention, the monitoring unit may include a reliability determiner that calculates a reliability value of the front camera when the camera signal curvature value calculated using the camera signal is equal to or greater than a threshold value compared to the reference curvature value.

According to the present invention, the reliability determiner may determine a percentage value of a difference between the camera signal curvature value and the reference curvature value as the reliability value of the front camera when the camera signal curvature value is equal to or greater than the threshold value compared to the reference curvature value.

According to the present invention, the monitoring unit may determine that the signal of the front camera is abnormal when the reliability value is greater than or equal to the threshold value during a predetermined time, and outputs a front camera abnormal signal, in which the monitoring unit outputs the front camera abnormal signal to at least one of a warning unit that notifies a driver of the abnormality and a vehicle control unit that performs control in such a manner as to transition an operation of a vehicle control system using the front camera to a standby state.

A camera signal monitoring method according to another aspect of the present invention includes receiving, by a monitoring unit, a vehicle speed and a yaw rate signal of a vehicle from a vehicle information input unit; receiving, by the monitoring unit, a road curvature signal provided in a high precision map from a navigation information input unit; receiving, by the monitoring unit, a camera signal including a vehicle speed and a yaw rate signal of a vehicle front camera from a camera information input unit; calculating, by the monitoring unit, a reference curvature value based on at least one of the vehicle speed and the yaw rate signal of the vehicle, which are input form the vehicle information input unit, or the road curvature signal from the navigation information input unit; and determining, by the monitoring unit, a reliability by comparing the calculated reference curvature value by the monitoring unit with a curvature value calculated using the camera signal input from the camera information input unit.

The method according to the present invention may further include filtering, by the monitoring unit, a signal input from at least one of the vehicle information input unit, the navigation information input unit, and the camera information input unit.

The method according to the present invention may further include calculating, by the monitoring unit, a vehicle driving trajectory using the vehicle speed and the yaw rate signal of the vehicle, which are input from the vehicle information input unit, after the receiving of the camera signal, wherein the calculating of the reference curvature value is provided so that the monitoring unit calculates the reference curvature value based on at least one of the calculated vehicle driving trajectory and the road curvature signal from the navigation information input unit.

The calculating of the vehicle driving trajectory according to the present invention may be provided so that the monitoring unit calculates the vehicle driving trajectory based on an offset-corrected yaw rate signal and the vehicle speed from the vehicle information input unit, and calculates a first curvature value by dividing a yaw rate value of the offset-corrected yaw rate signal by a vehicle speed value of the vehicle speed signal.

The calculating of the vehicle driving trajectory according to the present invention may be provided so that the monitoring unit calculates the vehicle travel trajectory when the vehicle speed value and the yaw rate value are less than or equal to a threshold value.

The calculating of the reference curvature value according to the present invention may be provided so that the monitoring unit calculates the reference curvature value by combining the first curvature value calculated by the vehicle trajectory calculator and a second curvature value of the road curvature signal input from the navigation information input unit.

The calculating of the reference curvature value according to the present invention may be provided so that the monitoring unit calculates the reference curvature value by combining the first curvature value and the second curvature value when the second curvature value is input from the navigation information input unit, and determines the first curvature value as the reference curvature value when the second curvature value is not input from the navigation information input unit.

The determining of the reliability according to the present invention may be provided so that when the camera signal curvature value calculated by the camera signal is equal to or greater than a threshold value compared to the reference curvature value, the monitoring unit calculates a reliability value of the front camera.

The determining of the reliability according to the present invention may be provided so that the monitoring unit calculates a percentage value of a difference between the camera signal curvature value and the reference curvature value as the reliability value of the front camera, when the camera signal curvature value is equal to or greater than the threshold value compared to the reference curvature value.

The method according to the present invention may further include outputting, by the monitoring unit, a front camera abnormal signal by determining that the signal of the front camera is abnormal, when the reliability value is greater than or equal to a threshold value during a predetermined time, wherein the outputting of the abnormal signal is provided so that the monitoring unit outputs the front camera abnormal signal to at least one of a warning unit that notifies a driver of the abnormality and a vehicle control unit that performs control in such a manner as to transition an operation of a vehicle control system using the front camera to a standby state.

The camera signal monitoring apparatus and method according to an embodiment of the present invention has an advantage that the reliability is determined with respect with whether a signal output from a vehicle front camera is abnormal, to notify the driver of the abnormality or perform control in such a manner as to transition the state of the control system to the standby state, thereby preventing a malfunction when controlling the vehicle using the camera.

In addition, the camera signal monitoring apparatus and method according to an embodiment of the present invention has an advantage that it is possible to primarily determine whether there is a problem with the camera signal by determining whether an calculation algorithm inside the camera is abnormal, rather than verifying the camera output signal, and when the camera signal is corrected, it is possible to prevent the camera from malfunctioning by comparing the camera signal with the vehicle signal.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
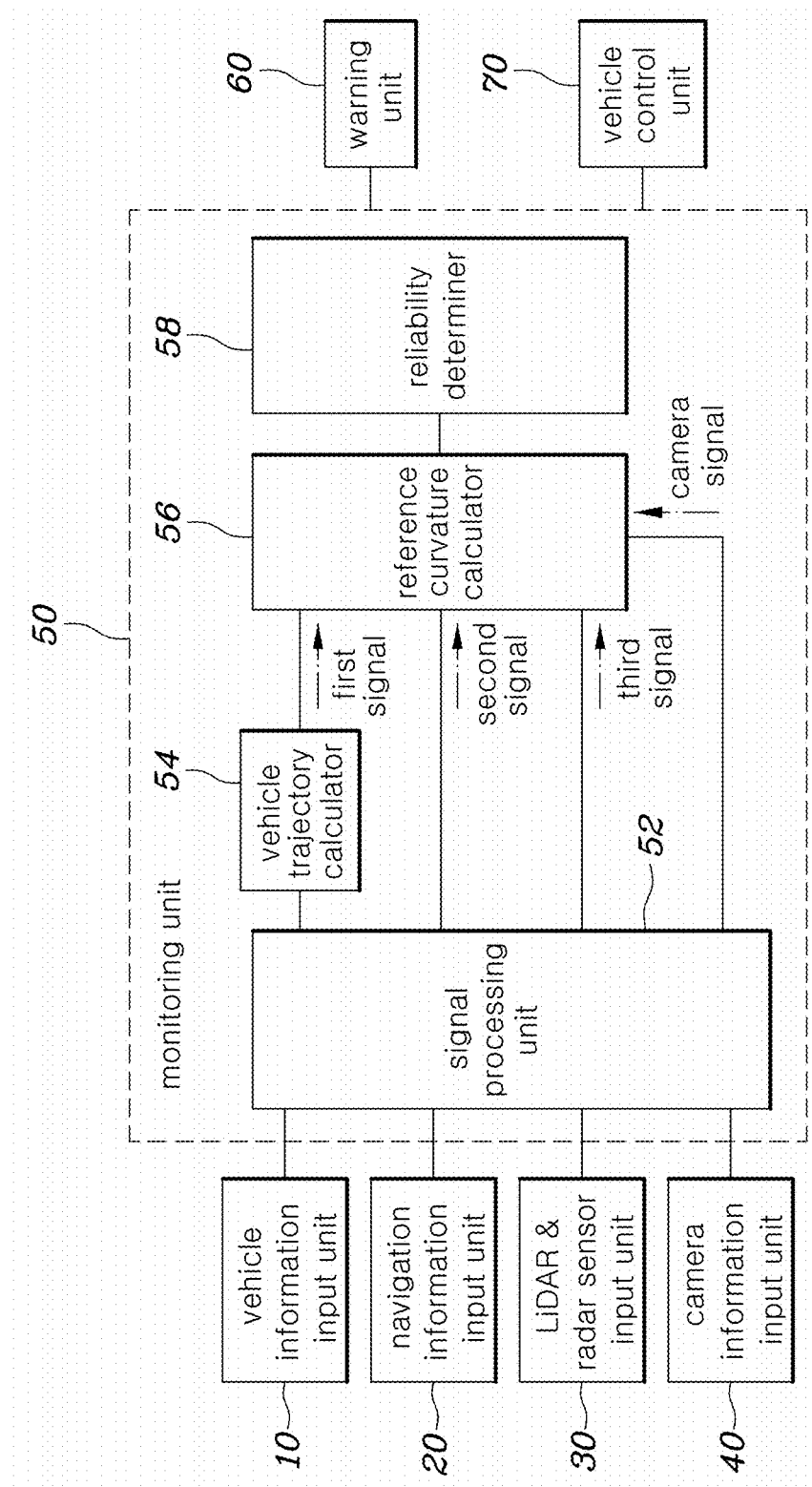
FIG. 1 is a block diagram showing a camera signal monitoring apparatus according to an embodiment of the present invention.

Hereinafter, a camera signal monitoring apparatus and method according to an embodiment of the present invention will be described with reference to the accompanying drawings. In this process, the thickness of lines or the size of components shown in the drawings may be exaggerated for clarity and convenience.

In addition, terms to be described later are tams defined in consideration of functions in the present invention, which may vary according to a user's or operator's intention or practice. Therefore, the definition of these terms should be made on the basis of the contents throughout the specification.

Also, the implementations described herein can be implemented, for example, as a method or process, apparatus, software program, data stream, or signal. Although discussed only in the context of a single form of implementation (e.g., discussed only as a method), implementation of the discussed features may also be implemented in other forms (e.g., devices or programs). The device can be implemented with suitable hardware, software and firmware, and the like. The method can be implemented in an apparatus, such as a processor, generally referring to a processing device, including, for example, a computer, microprocessor, integrated circuit, or programmable logic device. The processor also includes communication devices such as computers, cell phones, portable/personal digital assistants ("PDAs"), and other devices, which facilitate communication of information between end-users.

FIG. 1 is a block diagram showing a camera signal monitoring apparatus according to an embodiment of the present invention. Referring to FIG. 1, a camera signal monitoring apparatus will be described as follows.

As shown in FIG. 1, the camera signal monitoring apparatus according to an embodiment of the present invention includes a vehicle information input unit 10, a navigation information input unit 20, a LiDAR & radar sensor input unit 30, a camera information input unit 40, and a monitoring unit 50.

First, the vehicle front camera receives a vehicle yaw rate signal, vehicle speed information, etc. of a vehicle, and provides lane information, a lane offset, and curvature information for the purpose of vehicle control. Herein, when the yaw rate signal used inside the front camera is incorrectly input or erroneously corrected, there is an error in an output value, which results in malfunction when controlling the vehicle using the front camera. Accordingly, the present embodiment is characterized in that a signal processing unit inside the front camera enables determining whether the front camera is abnormal, in which when the signal of the front camera is input or corrected, the reliability is determined by comparing a camera signal of the front camera with a vehicle signal. Specifically, according to this embodiment, when it is determined that the signal of the front camera is abnormal, the monitoring unit 50 outputs the front camera abnormal signal to at least one of a warning unit 60 that notifies the driver of the abnormality, and a vehicle control unit 70 that performs control in such a manner as to transition an operation of the vehicle control system using the front camera to a standby state, thereby preventing malfunction when controlling a vehicle using the front camera.

The vehicle information input unit 10 receives overall vehicle control information from a vehicle control system that controls an operation of a vehicle, and further receives a vehicle speed and a yaw rate signal of a vehicle according to the embodiment. In addition, the vehicle information input unit 10 may receive the vehicle speed and the yaw rate signal of the vehicle, as well as sensing signals from sensors that sense steering angle, wheel speed, etc.

The navigation information input unit 20 receives a road curvature signal provided in a high precision map, and may provide the monitoring unit 50 with a road curvature value of a driving trajectory of a vehicle.

The LiDAR & radar sensor input unit 30 may receive sensing values from a light detection and ranging (LiDAR) sensor and a radio detection and ranging (radar) sensor provided in the vehicle. Meanwhile, although it is described that the LiDAR and the radar are integrated with each other in the embodiment, it does not mean that they are necessarily provided as an integrated sensor. The LiDAR sensor and the radar sensor may be separately provided, and both sensors may be provided in the vehicle, or only one of the two sensors may be provided.

The camera information input unit 40 receives camera signal information including a vehicle speed and a yaw rate signal from the vehicle front camera, and provides the same to the monitoring unit 50. Herein, in this embodiment, it is possible to determine whether the front camera is abnormal on the basis of the camera information provided by the camera information input unit 40. Meanwhile, although it is described that the camera information input unit 40 receives the camera signal from the front camera of the vehicle in the present embodiment, the camera information input unit 40 may receive camera signals from another camera provided in the vehicle.

The monitoring unit 50 sets a reference value on the basis of signals input from the vehicle information input unit 10 and the navigation information input unit 20 and compares the reference value with a signal input from the camera information input unit 40 to determine whether the front camera is abnormal. Herein, although not specifically described in this embodiment, the reference value may be set including the curvature value input from the LiDAR & radar sensor input unit 30.

Specifically, the monitoring unit 50 includes a signal processing unit 52, a vehicle trajectory calculator 54, a reference curvature calculator 56, and a reliability determiner 58. The monitoring unit 50 calculates a vehicle travel trajectory using a vehicle speed and a yaw rate signal of a vehicle, which are input from the vehicle information input unit 10, calculates a reference curvature value on the basis of at least one of the calculated vehicle travel trajectory and the road curvature signal from the navigation information input unit 20, and determines the reliability by comparing the calculated reference curvature value with a curvature value calculated by the camera signal input from the camera information input unit 40.

Herein, the signal processing unit 52 filters signals input from at least one of the vehicle information input unit 10, the navigation information input unit 20, and the camera information input unit 40, and also filters signals input from the LiDAR & radar sensor input unit 30. In addition, the signal processing unit 52 may provide each of the filtered signals to at least one of the vehicle trajectory calculator 54 and the reference curvature calculator 56. The method of filtering the signals received from the signal processing unit 52 may be implemented in various ways.

In addition, the vehicle trajectory calculator 54 calculates the vehicle driving trajectory on the basis of the vehicle speed and the yaw rate signal from the vehicle information input unit 10, in which the yaw rate signal may be an offset-corrected signal. Herein, the vehicle trajectory calculator 54 may calculate a first curvature value by dividing a yaw rate value of the offset-corrected yaw rate signal by a vehicle speed value of the vehicle speed signal. That is, the first curvature value means a curvature value for a first signal output from the vehicle trajectory calculator 54.

In addition, the vehicle trajectory calculator 54 may calculate the vehicle driving trajectory when the vehicle speed value and the yaw rate value are equal or less than a threshold value. This is to exclude situations of excessive steering and sudden acceleration/deceleration. In other words, in the case of excessive steering or sudden acceleration or deceleration, the vehicle driving trajectory is not calculated.

Next, the reference curvature calculator 56 combines the first curvature value calculated by the vehicle trajectory calculator 54 with a second curvature value of a road curvature signal received from the navigation information input unit 20, thereby calculating the reference curvature value. That is, the second curvature value refers to a road curvature signal provided in the high precision map of the navigation information input unit 20, that is, a curvature value for the second signal.

In addition, when the second curvature value is input from the navigation information input unit 20, the reference curvature calculator 56 calculates the reference curvature value by combining the first curvature value and the second curvature value, and when the second curvature value is not input from the navigation information input unit 20, the reference curvature calculator 56 may determine the first curvature value as the reference curvature value. Herein, the curvature value input from the LiDAR & radar sensor input unit 30 is a third curvature value, in which the reference curvature value may be calculated by combining the first curvature value, the second curvature value, and the third curvature value, but is not limited thereto.

The reliability determiner 58 may calculate the reliability value of the front camera when the camera signal curvature value calculated using the camera signal is equal to or greater than a threshold value compared to the reference curvature value. That is, the reliability determiner 58 may calculate the reliability value of the front camera when the camera signal curvature value calculated by the camera signal is greater than the reference curvature value by a threshold value or more.

Herein, when the curvature value of the camera signal is equal to or greater than the threshold value compared to the reference curvature value, the reliability determiner 58 may determine a percentage value of to difference between the camera signal curvature value and the reference curvature value as the reliability value of the front camera.

In addition, the monitoring unit 50 may determine that the signal of the front camera is abnormal when the reliability value is greater than or equal to a threshold value during the predetermined time. Further, when it is determined that the signal of the front camera is abnormal, the monitoring unit 50 may output the front camera abnormal signal to the warning unit 60 and the vehicle control unit 70. That is, the monitoring unit 50 may inform the driver of the front camera abnormal state by outputting the front camera abnormal signal to the warning unit 60, and perform control in such a manner as to transition an operation of the vehicle control system using the front camera to a standby state by outputting the abnormal signal to the vehicle control unit 70, thereby preventing malfunction due to the abnormality in the front camera.

Figure 2:
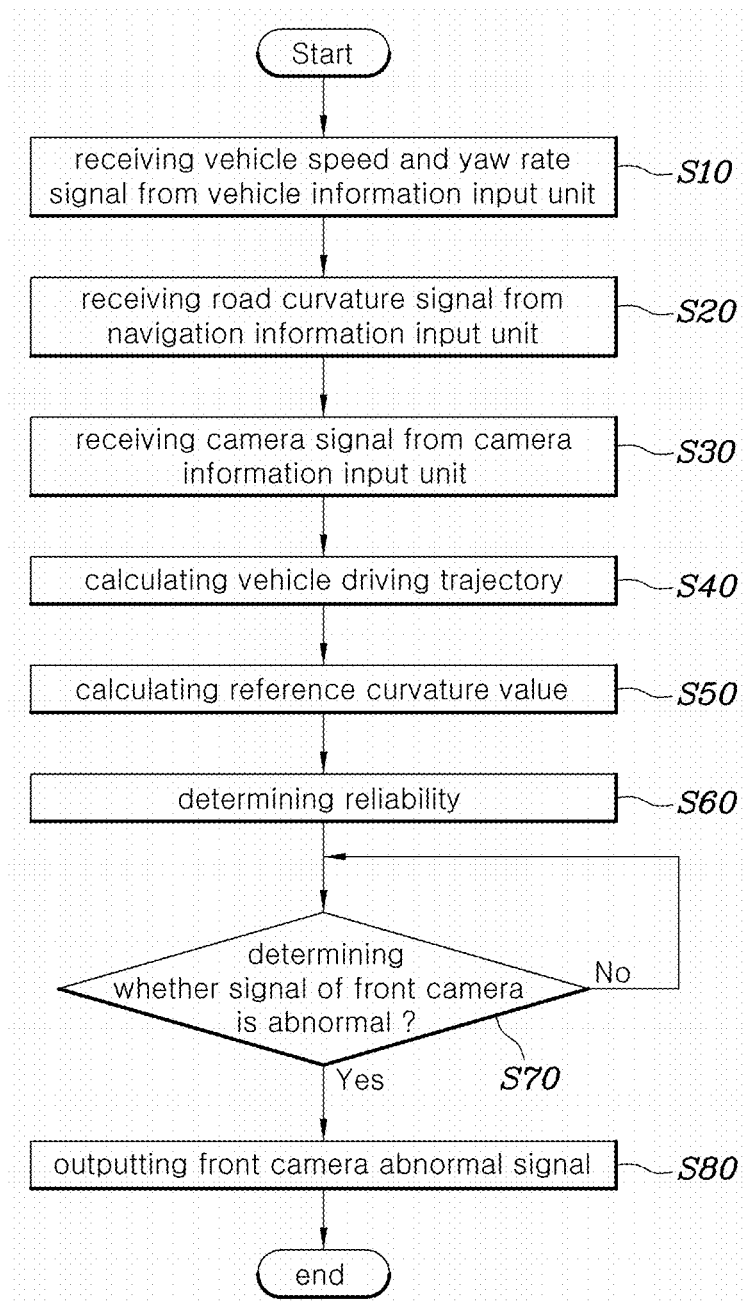
FIG. 2 is a flowchart showing a camera signal monitoring method according to an embodiment of the present invention.

FIG. 2 is a flowchart showing a camera signal monitoring method according to an embodiment of the present invention. Referring to FIG. 2, a camera signal monitoring method is described as follows.

As shown in FIG. 2, in the camera signal monitoring method according to an embodiment of the present invention, the monitoring unit 50 first receives a vehicle speed and a yaw rate signal of a vehicle from the vehicle information input unit 10 (S10).

Herein, the vehicle information input unit 10 receives overall vehicle control information from a vehicle control system that controls an operation of the vehicle, and according to this embodiment, receives the vehicle speed and the yaw rate signals of the vehicle.

Then, the monitoring unit 50 receives a road curvature signal provided in a high precision map from a navigation information input unit 20 (S20).

Herein, the navigation information input unit 20 receives a road curvature signal provided in the high precision map, and can provide the monitoring unit 50 with a road curvature value of a driving trajectory of the vehicle. In this embodiment, the road curvature signal input from the navigation information input unit 20 may be referred to as a second signal or a second curvature value.

Next, the monitoring unit 50 receives a camera signal including a vehicle speed and a yaw rate signal of the vehicle front camera from the camera information input unit 40 (S30).

Herein, the camera information input unit 40 receives camera signal information including a vehicle speed and a yaw rate signal from the vehicle front camera, and provides the same to the monitoring unit 50. According to this embodiment, it is possible to determine whether the front camera is abnormal on the basis of the camera information provided by the camera information input unit 40.

Meanwhile, in the present embodiment, the monitoring unit 50 may filter signals input from at least one of the vehicle information input unit 10, the navigation information input unit 20, and the camera information input unit 40.

Then, the monitoring unit 50 may calculate a vehicle driving trajectory using the vehicle speed and yaw rate signals of the vehicle, which are input from the vehicle information input unit 10 (S40).

Herein, the monitoring unit 50 calculates the vehicle driving trajectory on the basis of the vehicle speed and the yaw rate signal from the vehicle information input unit 10, in which the yaw rate signal may be an offset-corrected signal. Herein, the monitoring unit 50 may calculate a first curvature value (first signal) by dividing a yaw rate value of the offset-corrected yaw rate signal by a vehicle speed value of the vehicle speed signal.

In addition, the monitoring unit 50 may calculate the vehicle driving trajectory when the vehicle speed value and the yaw rate value are less than or equal to the threshold value. This is to exclude situations of excessive steering and sudden acceleration/deceleration. In other words, in the case of excessive steering or sudden acceleration or deceleration, the vehicle driving trajectory is not calculated.

In addition, the monitoring unit 50 may calculate the reference curvature value on the basis of at least one of the calculated vehicle driving trajectory and a road curvature signal from the navigation information input unit 20 (S50).

Herein, the monitoring unit 50 may calculate the reference curvature value by combining the calculated first curvature value and a second curvature value of the road curvature signal received from the navigation information input unit 20. Then, when the second curvature value is input from the navigation information input unit 20, the monitoring unit 50 calculates the reference curvature value by combining the first curvature value and the second curvature value, and when the second curvature value is not input from the navigation information input unit 20, the monitoring unit 50 determines the first curvature value as the reference curvature value.

Next, the monitoring unit 50 may determine the reliability by comparing the calculated reference curvature value with the curvature value calculated using the camera signal input from the camera information input unit (S60).

Herein, the monitoring unit 50 may calculate the reliability value of the front camera, when the camera signal curvature value calculated by the camera signal is greater than or equal to a threshold value compared to the reference curvature value. That is, the monitoring unit 50 may calculate the reliability value of the front camera when the camera signal curvature value calculated by the camera signal is greater than the reference curvature value by a threshold value or more. In addition, when the camera signal curvature value is greater than or equal to the threshold value compared to the reference curvature value, the monitoring unit 50 may determine a percentage value of a difference between the camera signal curvature value and the reference curvature value as the reliability value of the front camera.

Meanwhile, according to this embodiment, when the reliability value is greater than or equal to the threshold value during the predetermined time, the monitoring unit 50 may determine whether the signal of the front camera is abnormal (S70), and when it is determined that the signal of the front camera is abnormal, the monitoring unit 50 may output an front camera abnormal signal (S80).

Herein, the monitoring unit 50 may output the front camera abnormal signal to at least one of the warning unit 60 that notifies the driver of the abnormality and the vehicle control unit 70 that performs control in such a manner as to transition an operation of the vehicle control system using the front camera to a standby state.

However, when it is determined in step S70 that the signal of the front camera is not abnormal, the monitoring unit 50 may determine whether the reliability value is equal to or greater than the threshold value during the predetermined time or may otherwise terminate the operation.

As described above, the camera signal monitoring apparatus and method according to an embodiment of the present invention has an advantage that the reliability is determined with respect with whether the signal output from the vehicle front camera is abnormal, to notify the driver of the abnormality or perform control in such a manner as to transition the state of the control system to the standby state, thereby preventing malfunction when controlling the vehicle using the camera.

In addition, the camera signal monitoring apparatus and method according to an embodiment of the present invention has an advantage that it is possible to primarily determine whether there is a problem with the camera signal by determining whether an calculation algorithm inside the camera is abnormal, rather than verifying the camera output signal, and when the camera signal is corrected, it is possible to prevent the camera from malfunctioning by comparing the camera signal with the vehicle signal.

The present invention has been described with reference to the embodiment shown in the drawings, but this is only exemplary, and those skilled in the art to which the art pertains will appreciate that various modifications and other equivalent embodiments are possible.

Therefore, the true technical protection scope of the present invention should be defined by the claims below.

What is claimed is:

1. A camera signal monitoring apparatus, comprising:
a vehicle information input unit receiving a vehicle speed signal and a yaw rate signal of a vehicle;
a navigation information input unit receiving a road curvature signal provided in a high precision map;
a camera information input unit receiving a camera signal including a vehicle speed signal and a yaw rate signal from a vehicle front camera; and
a monitoring unit calculating a reference curvature value based on at least one of the vehicle speed signal and the yaw rate signal of the vehicle, which are input from the vehicle information input unit, or the road curvature signal from the navigation information input unit, and determining a reliability by comparing the calculated reference curvature value with a camera signal curvature value calculated using the camera signal input from the camera information input unit,
wherein the monitoring unit includes a vehicle trajectory calculator that calculates a first curvature value by dividing a yaw rate value of an offset-corrected yaw rate signal by a vehicle speed value of the vehicle speed signal input from the vehicle information input unit, and
wherein the monitoring unit includes a reference curvature calculator that calculates the reference curvature value by combining the first curvature value calculated by the vehicle trajectory calculator and a second curvature value of the road curvature signal received from the navigation information input unit.

2. The apparatus of claim 1, wherein the monitoring unit includes a signal processing unit that filters signals input from at least one of the vehicle information input unit, the navigation information input unit, and or the camera information input unit.

3. The apparatus of claim 1, wherein the vehicle trajectory calculator calculates a vehicle driving trajectory on the basis of the offset-corrected yaw rate signal and the vehicle speed signal input from the vehicle information input unit.

4. The apparatus of claim 3, wherein the vehicle trajectory calculator calculates the vehicle driving trajectory when the vehicle speed value and the yaw rate value are less than or equal to a threshold value.

5. The apparatus of claim 3, wherein the reference curvature calculator calculates the reference curvature value by combining the first curvature value and the second curvature value when the second curvature value is input from the navigation information input unit, and determines the first curvature value as the reference curvature value when the second curvature value is not input from the navigation information input unit.

6. The apparatus of claim 1, wherein the monitoring unit includes a reliability determiner that calculates a reliability value of the front camera when a difference between the camera signal curvature value calculated using the camera signal and the reference curvature value is equal to or greater than a threshold value.

7. The apparatus of claim 6, wherein the reliability determiner determines a percentage value of a-the difference between the camera signal curvature value and the reference curvature value as the reliability value of the front camera when the difference between the camera signal curvature value and the reference curvature value is equal to or greater than the threshold value.

8. The apparatus of claim 6, wherein the monitoring unit determines that the camera signal of the front camera is abnormal when the reliability value that is greater than or equal to the threshold value lasts for a predetermined time, and outputs a front camera abnormal signal, wherein the monitoring unit outputs the front camera abnormal signal to at least one of a warning unit that notifies a driver of an abnormality of the front camera or a vehicle control unit that performs a control of transitioning an operation of a vehicle control system using the front camera to a standby state.

9. A camera signal monitoring method, comprising:
receiving, by a monitoring unit, a vehicle speed signal and a yaw rate signal of a vehicle from a vehicle information input unit;
receiving, by the monitoring unit, a road curvature signal provided in a high precision map from a navigation information input unit;

receiving, by the monitoring unit, a camera signal including a vehicle speed signal and a yaw rate signal of a vehicle front camera from a camera information input unit;

calculating, by the monitoring unit, a reference curvature value based on at least one of the vehicle speed signal and the yaw rate signal of the vehicle, which are input form the vehicle information input unit, or the road curvature signal from the navigation information input unit; and determining, by the monitoring unit, a reliability by comparing the calculated reference curvature value by the monitoring unit with a curvature value calculated using the camera signal input from the camera information input unit, wherein the calculating of the reference curvature value comprises:

calculating a first curvature value by dividing a yaw rate value of an offset-corrected yaw rate signal by a vehicle speed value of the vehicle speed signal input from the vehicle information input unit and calculating the reference curvature value by combining the calculated first curvature value and a second curvature value of the road curvature signal input from the navigation information input unit.

10. The method of claim 9, further comprising: filtering, by the monitoring unit, a signal input from at least one of the vehicle information input unit, the navigation information input unit, or the camera information input unit.

11. The method of claim 9, further comprising:

calculating, by the monitoring unit, a vehicle driving trajectory using the vehicle speed signal and the yaw rate signal of the vehicle, which are input from the vehicle information input unit, after the receiving of the camera signal, wherein the calculating of the reference curvature value further comprises calculating the reference curvature value based on at least one of the calculated vehicle driving trajectory or the road curvature signal from the navigation information input unit.

12. The method of claim 11, wherein the calculating of the vehicle driving trajectory comprises calculating the vehicle driving trajectory based on an offset-corrected yaw rate signal and the vehicle speed signal input from the vehicle information input unit.

13. The method of claim 12, wherein the calculating of the vehicle driving trajectory comprises calculating the vehicle travel trajectory when the vehicle speed value and the yaw rate value are less than or equal to a threshold value.

14. The method of claim 12, wherein the calculating of the reference curvature value further comprises calculating the reference curvature value by combining the first curvature value and the second curvature value when the second curvature value is input from the navigation information input unit, and determining the first curvature value as the reference curvature value when the second curvature value is not input from the navigation information input unit.

15. The method of claim 9, wherein the determining of the reliability comprises calculating a reliability value of the front camera when a difference between the camera signal curvature value calculated by the camera signal and the reference curvature value is equal to or greater than a threshold value.

16. The method of claim 15, wherein the determining of the reliability comprises calculating a percentage value of the difference between the camera signal curvature value and the reference curvature value as the reliability value of the front camera, when the difference between the camera signal curvature value and the reference curvature value is equal to or greater than the threshold value.

17. The method of claim 15, further comprising:

outputting, by the monitoring unit, a front camera abnormal signal by determining that the camera signal of the front camera is abnormal, when the reliability value that is greater than or equal to the threshold value lasts for dring a predetermined time, wherein the outputting of the abnormal signal comprises outputting the front camera abnormal signal to at least one of a warning unit that notifies a driver of an abnormality of the front camera and ora vehicle control unit that performs a control transitioning an operation of a vehicle control system using the front camera to a standby state.

* * * * *